J. H. THOMPSON.
File Cutting Machine.
No. 8,697.
Patented Jan'y 27, 1852.
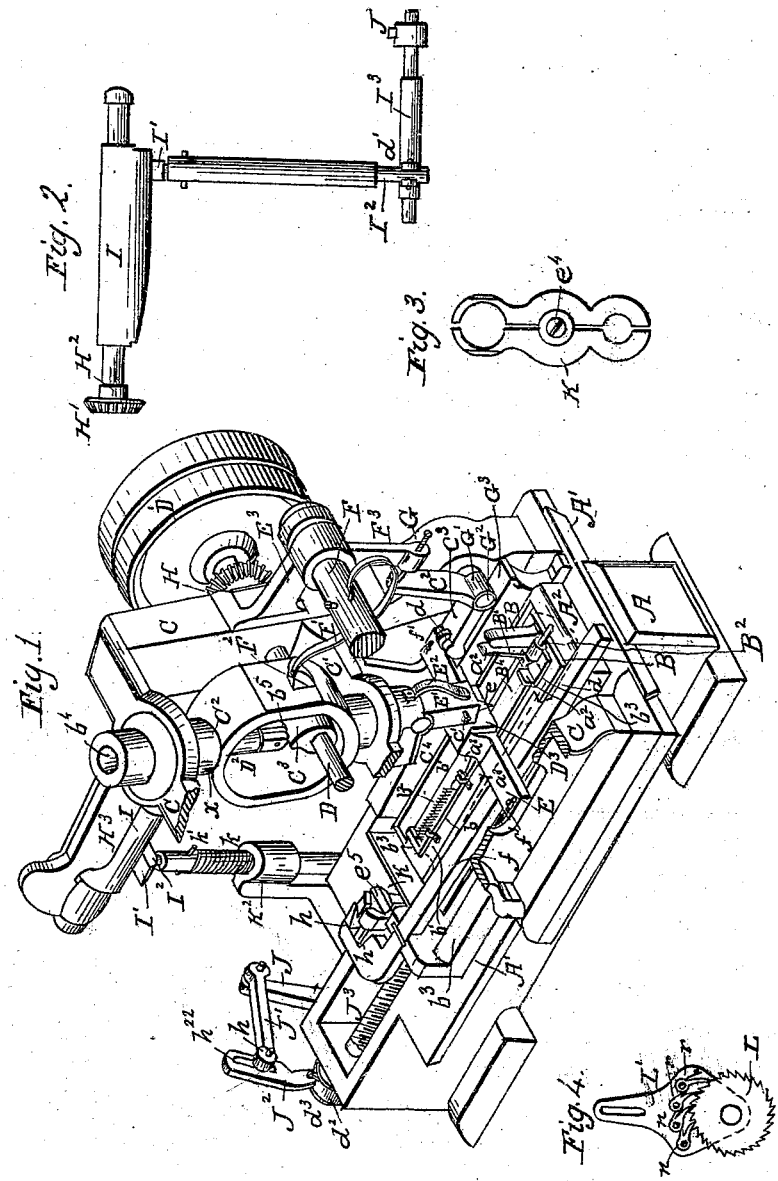

UNITED STATES PATENT OFFICE.

JAMES H. THOMPSON, OF PATERSON, NEW JERSEY.

IMPROVEMENT IN FILE-CUTTING MACHINES.

Specification forming part of Letters Patent No. 8,697, dated January 27, 1852.

*To all whom it may concern:*

Be it known that I, JAMES H. THOMPSON, of Paterson, in the county of Passaic and State of New Jersey, have invented certain new and useful Improvements in Machines for Cutting Files; and I do hereby declare that the same is described and represented in the following specification and accompanying drawings.

Good files cut by hand, if made tapering one or both ways, are usually cut finer on the smaller or thinner parts than upon the large part, somewhat in proportion to the size or thickness of the file, and the chisel, when held in the hand, yields with a compound motion toward the tang, so that its edge moves in a curve and not in a straight line when it is struck with the hammer and raises a tooth, which is very poorly imitated by any machine heretofore invented for cutting files. The difficulty with all the machines appears to be that the chisel raises what little tooth it forms by the inclination of its stroke and by scraping toward the tang, and not by being driven under the base of the tooth, so as to carry the edge of the chisel in an elliptical curve, so as to raise the tooth by lifting it up in the same way that it is effected in cutting files by hand; but the chisel moving in a straight line with a slight inclination strikes the file and raises a little more burr upon the side of the chisel toward the tang than upon the opposite side, but not sufficient to form a perfect tooth, even if the small burr raised by the succeeding stroke on the opposite side of the chisel did not rise so as to render it very imperfect by standing partly upon it; but as the small burr rises partly upon and contiguous to the large burr, which is to constitute the effective tooth of the file, the tooth has not that prominence and sharpness necessary to constitute a good file, neither is its form so perfect as the tooth cut by hand, for as soon as the large burr is worn down by use to the plane of the small burr, so that the small burr comes in contact with the material filed, the file ceases to cut, and is thus worn out much sooner and before it has performed half the service of a hand-cut file, in which the burr is all raised upon that side of the chisel next to the tang, and of course the tooth is more prominent and better shaped than the machine-cut files, which are cut by a chisel moving in a straight line. Hence machine-cut files have all been condemned by skillful workmen when practically applied to use, for the reasons above stated.

Numerous machines have been invented for cutting files; but they have all been very defective, and the files made upon them have been very imperfect, for most files are largest in the middle and taper toward each extremity, and scarcely any two file-blanks are exactly of the same form or size. Hence a bed made to fit one would hardly fit any other. Consequently the bed must be made of a proper form and the file allowed to adjust itself to the bed as it is cut, besides all the machines heretofore have fed the file uniformly from end to end, making the teeth upon the small part of the file just as far apart as upon the large, and of course requiring the teeth to be cut just as deep upon the small as upon the large part to raise the teeth to an edge which cuts the file so near off upon the thin part as to render it very liable to break.

In some, if not all the machines, the bed and file are traversed, which produces imperfections of two kinds. First, its being detached from the other parts of the machine to allow it to traverse, it is not sufficiently firm and solid to receive the blow of the chisel, and, second, the chisel sometimes pushes it forward or it recoils from the stroke and does not recover its proper position before the chisel strikes again, thus varying the length of the spaces between the cuts, so as to make the teeth irregular and uneven. Besides, the file tapering each way from the center and the teeth cut diagonally across the file, the cutting-edge of the chisel is nearer to one edge than the other, and when the position of the chisel is changed to cut the file in the opposite direction it is nearest to the other edge, thus cutting it deepest at one edge when cut one way and deepest at the other edge when cut the other way, making the teeth highest at each edge and lowest in the middle, where they should be highest, producing a very imperfect file. This defect is remedied most effectually by placing the file upon a rolling bed well known to file-makers; but if a roller is used just before the chisel to press the files against the rolling bed it prevents the rolling bed from effecting the object intended, for the file being thickest in the middle and thinner toward each extremity and the roller presses it against the bed just in advance of the chisel, which makes it lay solid upon the bed near where the chisel strikes it the pressure of the roller causes so much friction between the rolling bed and its case as to prevent it from moving freely, and in great measure defeats the object intended to be effected by allowing it to roll. Besides, this roller is placed so as to roll on the center of the file when the largest part of the file is under it, and so as to tip the bed as far one way as the other, as the thinner parts of the file pass under it. Consequently the chisel inclines the bed when it strikes upon the thin part, so that the roller does not act against its center. Then as the chisel is raised the action of the roller partially rights up the bed, and when the chisel strikes the file it inclines the bed again, and thus the bed is inclined and righted up alternately every time the chisel cuts a tooth, and is kept constantly vibrating with a continued tendency to cut the file deepest at one edge; and, further, the roller presses the file against the bed directly under itself and not directly under where the chisel strikes it, but some three-fourths of an inch (or thereabout) from it, so that when the chisel strikes the file it is pressed against the bed right under the chisel and raises the roller, and as the chisel is raised the roller presses the file against the bed right under itself again, so that the file is kept vibrating by the action of the roller and the chisel tending to render it imperfect.

By my invention and improvements I have overcome all the defects above enumerated, so that files cut by my machine are equal to the best hand-cut files. By fitting the rolling bed into the base or bed of the machine, so as to hold it firmly and render it more solid and not liable to be deranged by the stroke of the chisel upon the file as it is when traversed upon ways, and traversing the chisel, stock, sliding bar, and the apparatus to operate them in a proper carriage, the motion of which carriage is graduated so as to cut the teeth in proportion to the size of the file, cutting them nearer together upon the thin part and increasing the distance between the teeth as the size of the file increases until the chisel gets to the largest place in the file, then decreasing the distance between the teeth as the file decreases toward the tang, all the variation in distances between the teeth of the file being effected by an elongated elliptical-shaped cam. Besides, I place an inclined plane behind the chisel-stock which is connected to the sliding bar by a joint which allows the chisel to vibrate in a line with the file or at right angles to the edge of the chisel (the pin of said joint being at right angles to the file or parallel to the edge of the chisel) or nearly parallel to the edge of the chisel, or to a line at right angles to the file, so that the inclined plane causes the edge of the chisel to move in a curve toward the tang, when it strikes the file and raises the tooth by driving under its base rather than by scraping the apex of the tooth toward the tang, the chisel-stock being pressed against the inclined plane by a spring, and the pin of the joint connecting the stock to the sliding bar being pressed into its bearings by springs, so as to hold it firmly against the end of the bar, notwithstanding what it may wear, also allowing the chisel to adjust the rolling bed, and the file upon the bed, as the springs which press against the cross upon the tang of the file or the slide pressed against the point by a spring, or both combined hold the file in the exact position the chisel places it by one stroke until it strikes it again, thereby dispensing with the roller used to press the file against the bed and avoiding the vibrations of the bed and file heretofore mentioned caused by said roller, and consequently the defects caused by said vibrations. Besides, my machine does much better and more perfect work in consequence of the case of the rolling-bed being fastened firmly to the bed of the frame, and the carriage carrying the chisel which gives the stroke is not so likely to be deranged by the stroke so given as a carriage carrying the rolling-bed and receiving the stroke.

To enable others skilled in the art to make and use my invention, I will proceed to describe its construction and operation, referring to the accompanying drawings, of which—

Figure 1 is an isometrical view. Fig. 2 is a view of the elongated elliptical cam and the parts connected with it; Fig. 3, the nut connected to the carriage; Fig. 4, a lever, pawls, and ratchet, which may be used to operate the screw.

The same letters indicate like parts in all the figures.

A is the bottom bed or frame, made in the form represented, with two flanges projecting from it, which form the ways A' A' for the carriage to traverse upon, to be described hereinafter. The elevation $A^2$ is permanently fastened to the middle of the bed and has a semicircular cavity in it, (represented by the dotted lines $a\ a$,) into which the rolling-bed $A^3$ is fitted so as to roll easily either way and allow the chisel, when it strikes the file, to bring or adjust its surface parallel to the edge of the chisel. Near the end of the bed $A^3$ are two pillars (one is represented as broken off) with sufficient space between them for the round part of the cross $B^3$ upon the tang $B^2$, (of the file $B^4$,) which cross is fastened to the file by the set-screw B' and is pressed against the pillars B B by the springs $a^2\ a^2$, fastened into the rolling bed at a proper distance from the pillars for that purpose, so that as the cross is raised or depressed by the stroke of the chisel upon the file the springs retain it in the position the chisel leaves it until it is struck again. The small end of the file is held upon the center of the bed by the projections $a^3\ a^3$, placed there for that purpose. Besides, there is a slide $b$, which fits the small end of the file, being drawn against it by the spring $b^2$, which slide traverses under the brackets $b'$ $b'$, which are high enough to allow it to vibrate up and down with the file as it is adjusted to the bed by the chisel.

The carriage which carries the cutting apparatus is made with two sides C C, (one of which is represented as broken off,) fitted to traverse on the ways A' A', which sides are connected together by the frame $b^3$ $b^3$ and by the cross-bars C' C', forming the bearings of the sliding bar $C^2$, in which it traverses, being raised by the cam $C^3$ upon the shaft D, which shaft turns in holes bored through the sides C C, and has the pulley D' fastened to it, to which the belt is applied to operate the machine. The sliding bar $C^2$ is made with a large bow, in the center of which the cam $C^3$ turns and acts against the roller $b^5$, which turns on a pin passing through the slide $D^2$, which fits in the hole $b^4$ (bored from the end of the sliding bar through to the bow) and is fastened by the set-screw $c$. The sliding bar $C^2$ has a feather fastened to it which fits a notch in the bar C' to prevent the sliding bar from turning. The lower end of the sliding bar has a semicircular score across it, into which the bearing of the chisel-stock E' is fitted, so as to vibrate freely, which bearing of the chisel-stock is pressed into said score by two springs, one of which is shown at $C^4$, which springs are drawn against the bearings by screws which pass through them into the end of said bar, so as to hold the stock firmly against the bar notwithstanding what it wears by being vibrated by the inclined plane $D^3$, against which the stock slides, which inclined plane $D^3$ is upon the bar E, fastened to the sides C C, upon which it may be adjusted by the screws $f'$ $f'$, so as to carry the edge of the chisel forward in the curve required to form a proper tooth upon the file and raise the tooth by driving under its base rather than by scraping it toward the tang. The chisel $e$ is fitted into the chisel-stock E' and secured by the set-screw $c'$, and when the file has been cut one way the chisel may be turned so as to cut in the opposite direction. The chisel-stock is pressed against the inclined plane by the spring $E^2$, fastened to the sliding bar for that purpose, so as to press it back as it is drawn up to make a new stroke. The stand $E^3$, fastened to the side C, supports one of the bearings (the other being supported by a similar stand) of the rock-shaft F, which has one end of the C-spring F' fastened in it, and the other end acts against the knob $F^2$ upon the bow of the sliding bar to propel it down with the force required to make the cut. The arm $F^3$, fastened to the shaft F, has the screw G in it, which acts against the arm $c^2$ of the crooked lever G', so as to adjust the pressure of the spring F' upon the knob $F^2$. The lever G' vibrates upon the stud $G^2$, fastened into the side C, and the arm $c^3$ has the roller $d$ in it, which travels upon the curved plane $G^3$, fastened to the bed A, which curved plane is designed to vary the pressure of the spring so as to adapt the stroke of the chisel to the width, thickness, and degree of feed or length of the spaces between the teeth upon the file.

The gear H upon the shaft D turns the gear H' and cam-shaft $H^2$, which shaft turns upon bearings in stands fastened to the side C, one of which stands is seen at $H^3$. The shaft $H^2$ has the elongated elliptical cam I upon it, which is traversed by the carriage over the cross-head I', and upon which it acts, forcing down the traverse-rod $I^2$ through the stand $K^2$ (fastened to the bed A) to vibrate the short arm $d'$ of the rock-shaft $I^3$, (see Fig. 2,) which turns in stands fastened to the bed A and vibrates the arm J and traverses the rod J', connected to it and to the lever $J^2$, which is fastened to the ends of the friction-strap $d^2$ upon the pulley $d^3$ by two pins, which pass through the ends of the strap and lever, and arranged so that when the lever $J^2$ is moved in the direction indicated by the →→ it draws the strap $d^2$ tight and turns the pulley $d^3$; but when the lever $J^2$ is moved the other way by the spring $k$, which acts against the stand $K^2$ and pin $k'$ in the rod $I^2$, pressing it up to the cam I, it loosens the strap $d^2$ so that it slips around the pulley without turning it. The pulley $d^3$ is fastened to the screw $J^3$ and turns in appropriate bearings in the bed A, and traverses the nut K, fastened by the screw $e^4$ (see Fig. 3) to the frame $b^2$ of the carriage to traverse it. The screw $e^4$ passes through the joint connecting the two parts of the nut together, and upon which they vibrate when acted by the wedge $e^5$, which forces the upper ends of the nut apart, closing it upon the screw $J^3$ to traverse the carriage. When the carriage has traveled so far as to cut the length of the file, the attendant moves the rod $f$ so as to shove out the wedge $e^5$, when the inclined sides $h$ $h$ of the hook on the rod $f$ draw the top of the nut together, releasing it from the screw, so that the carriage may be run back, then by pushing the rod $f$ the hook is pushed off and the wedge pushed in so as to close the nut upon the screw to start again. The screw may be made to turn more or less at each revolution of the cam by changing the position of the stud $h'$ in the slot $h^2$ in the lever $J^2$. The apex of the cam I is curved, and as it passes over the cross I' it graduates the feed of the carriage and spaces between the teeth upon the file-cut, so as to proportion them to the size and thickness of the different parts of the same file, the curve of the plane $G^3$ being graduated so as to vary the strokes of the chisel to correspond with the distance graduated for each tooth by the cam I, and also to the varying width and thickness of the file.

Instead of the pulley $d^3$ and lever $J^2$ the ratchet-wheel L may be fastened upon the screw, (see Fig. 4,) which should be fitted to turn freely in the lever L', (see dotted lines,) and a series of studs $n$ $n$, fastened in said lever with pawls $m$ $m$ pressed against the teeth by the springs $r$ $r$, so that if the lever L' is vibrated by the rod J', as described, it will turn the wheel L and screw by the pawls catching upon the teeth of the wheel, said pawls being so adjusted as to move the wheel L if the lever L' traverses the pawls a little more than one-fourth of the space allotted to one tooth upon the wheel L.

I contemplate that a roller may be used instead of the inclined plane behind the chisel-stock, and also that the slide $b$ may be made to press the cross so hard against the pillars B B that the springs $a^2$ may be dispensed with, or that the springs $a^2$ may hold the cross so firm that the slide $b$ may be dispensed with, although in cutting large files it is important to use both devices; also instead of traversing the cam I that the traverse rod $I^2$ may be arranged so as to traverse under it to produce the same result.

What I claim as my invention, and desire to secure by Letters Patent, is—

1. The traveling and revolving elongated elliptical cam I, in combination with the connecting-rod $I^2$ or its equivalent communicating a varying amount of motion to the rock-shaft, which motion is conveyed through suitable mechanism, substantially such as is described, to the screw, by means of which a varying rate of travel is communicated to the chisel.

2. The inclined plane or its equivalent, in combination with the jointed chisel-stock or its equivalent, pressed against said plane by the spring $E^2$ or its equivalent, substantially as described.

3. The springs or their equivalents to press the axis of the stock into the scores in the sliding bar.

4. The springs, or slide and spring, whether used separately or combined, to press the cross against the pillars so that the file may remain upon the bed in that position in which it is placed by one stroke of the chisel until it is struck again, thereby dispensing with the roller heretofore used to press the file against the bed.

In testimony whereof I have hereunto signed my name before two subscribing witnesses.

JAMES H. THOMPSON.

Witnesses:
   JOHN EVANS,
   GEORGE L. MEDEN.